May 12, 1964   U. C. LINTON   3,132,758
MOBILE TRAILER
Filed May 23, 1961   3 Sheets-Sheet 1
FIG. 1.
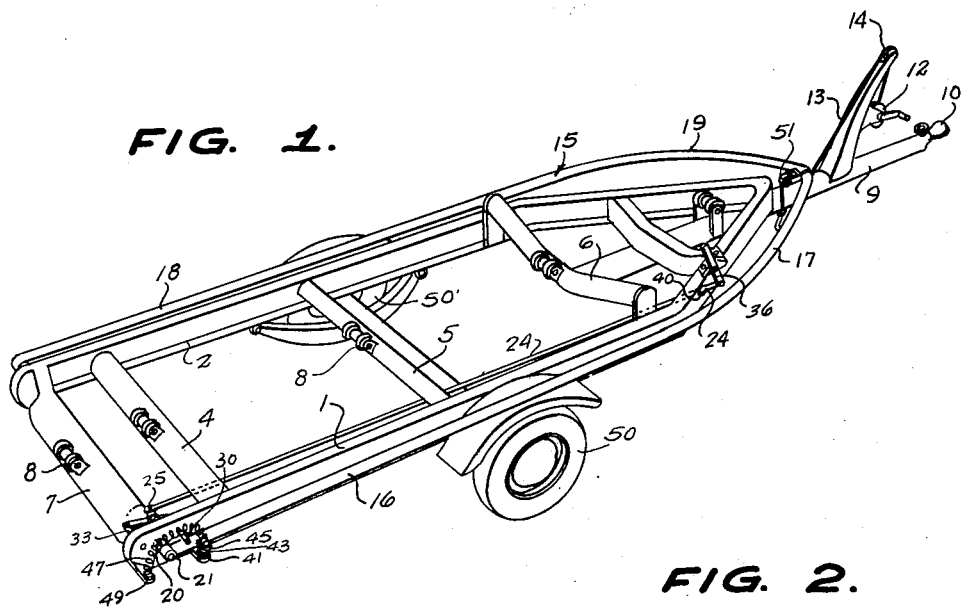
FIG. 2.
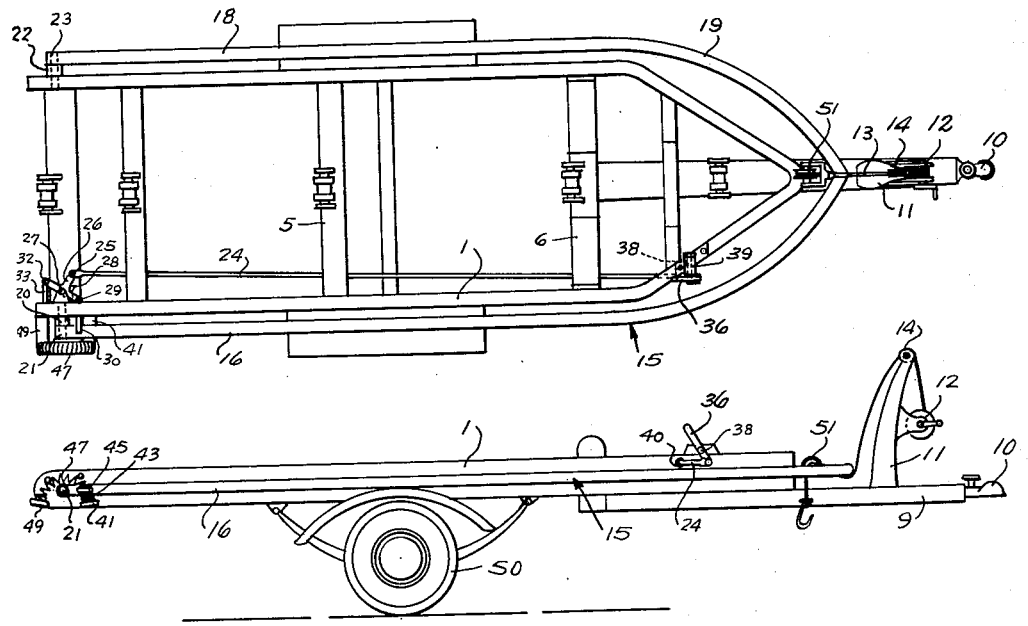
FIG. 3.
INVENTOR.
ULLE C. LINTON,
BY Linton and Linton
ATTORNEYS.

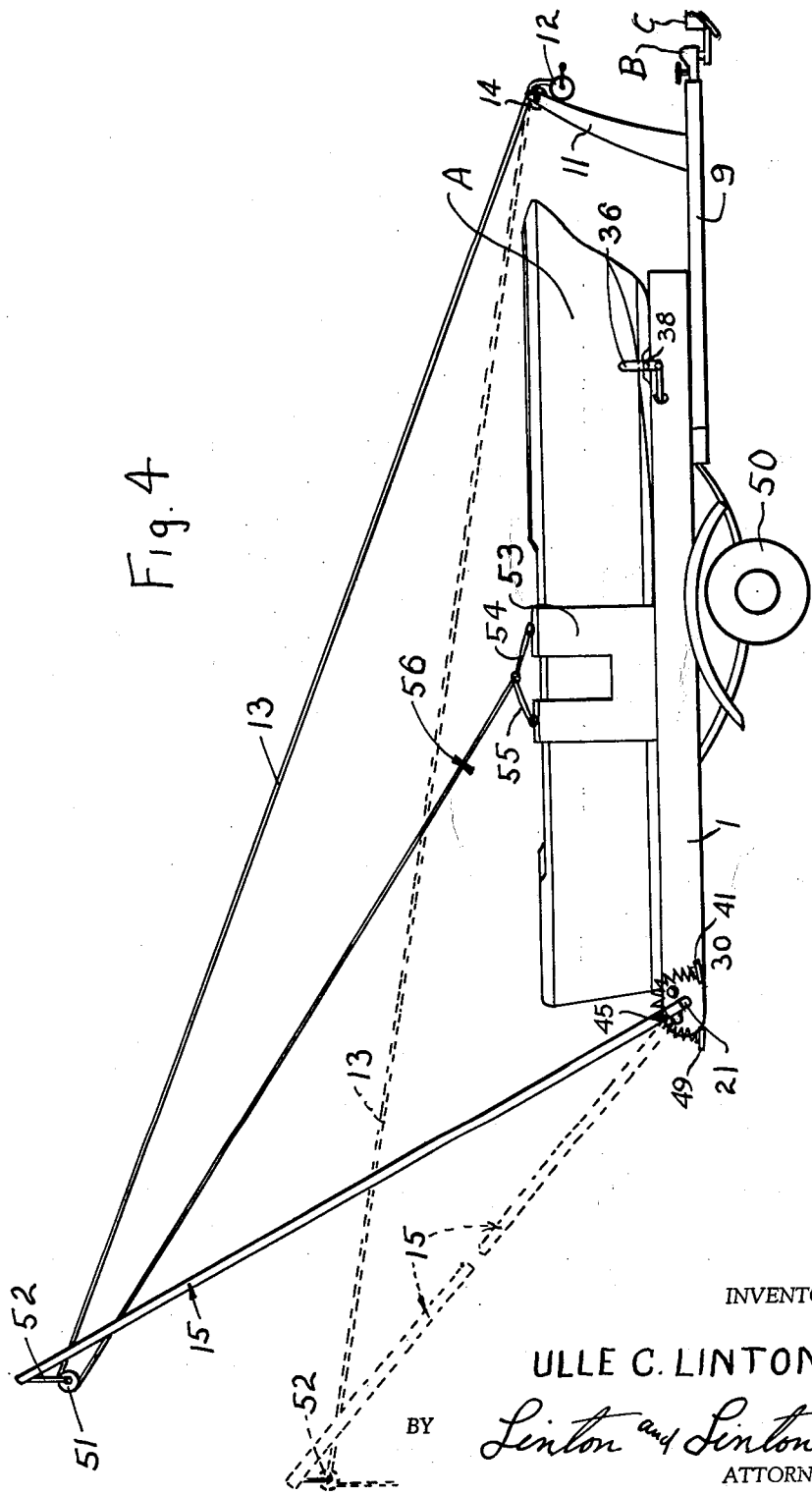

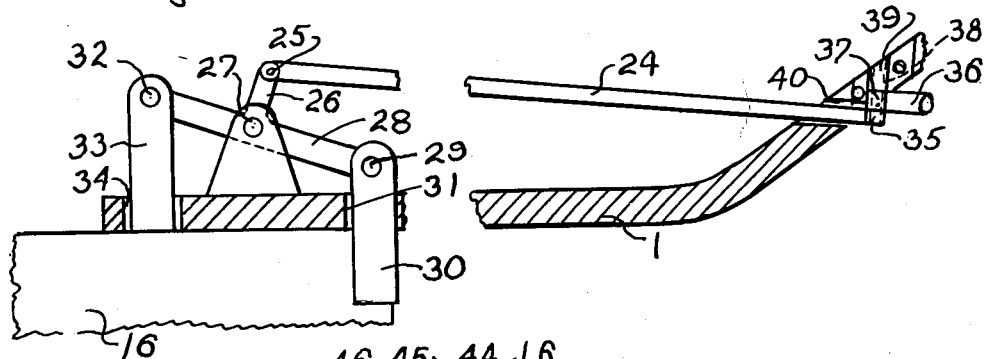
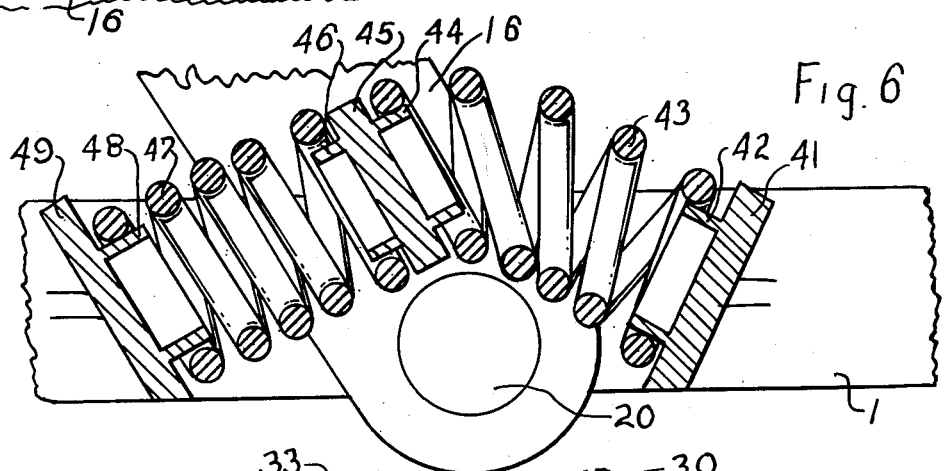
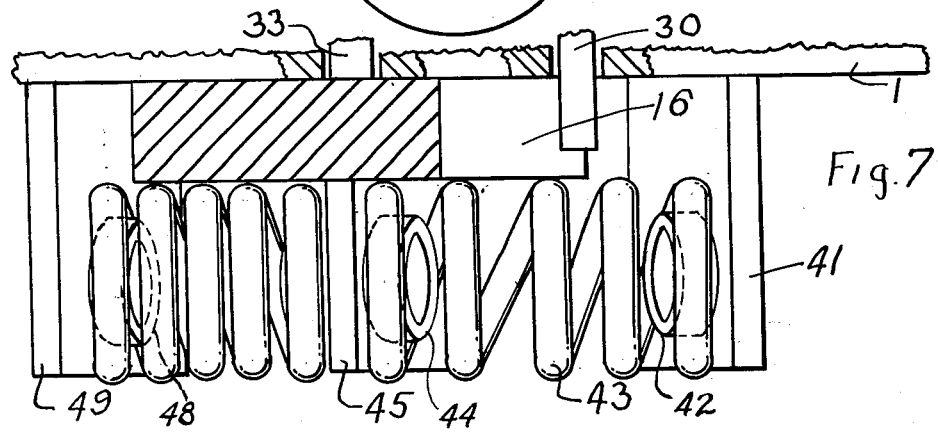

United States Patent Office 3,132,758
Patented May 12, 1964

3,132,758
MOBILE TRAILER
Ulle C. Linton, 4322 Alton Place NW., Washington, D.C.
Filed May 23, 1961, Ser. No. 112,049
3 Claims. (Cl. 214—523)

The present invention relates to mobile trailers and is more particularly concerned with a trailer to be drawn by a motorized vehicle and which trailer supports various type objects upon the top side thereof.

The principal object of the present invention is to provide an improvement in trailers to be drawn behind automobiles, trucks, and the like for carrying boats, small vehicles, boxes and the like upon a supporting frame and which trailer can quickly and easily unload and load such objects behind the trailer by lifting the objects onto and off the trailer.

Another important object of the invention is to provide a trailer for supporting various objects thereon and which objects can be picked up or lowered a distance behind the trailer and which action is controlled from a position adjacent the end of the trailer while still connected to the towing vehicle.

Further objects of the invention will be in part obvious and in part pointed out in the following detailed description of the accompanying drawings in which:

FIG. 1 is a top perspective view of the present trailer.

FIG. 2 is a plan view of said trailer.

FIG. 3 is a side elevation of the trailer.

FIG. 4 is a side elevation of the trailer positioned for unloading a boat supported thereon.

FIG. 5 is an enlarged, detailed, partial, cross-sectional view of limiting means forming part of the trailer.

FIG. 6 is a further enlarged, detailed, sectional view of the spring means forming part of the trailer; and FIG. 7 is a top plan view partly in section of the spring means of FIG. 6.

Referring now more particularly to the accompanying drawings, there is shown in the drawings by way of an example only a sample boat trailer to be drawn by a motorized vehicle such as a passenger car, light truck, or the like. This trailer consists of a pair of side frames 1 and 2 which meet at their apex 3 which is the forward end of the trailer and are rigidly connected together by cross members 4, 5, and 6. A rear end cross bar 7 joins said side pieces and supports a roller 8 thereon while similar rollers are positioned along the trailer upon the additional cross members.

A rod 9 extends longitudinally of and from said trailer and is fixedly connected to the forward end 3 thereof. Said rod supports an upright 11 which has a reel 12 for controlling a flexible member 13 such as a rope, cable or the like over a roller 14 upon the top of said upright. A connecting member such as a ball type 10 is connected to the forward end of rod 9 for joining the same to a mating member carried by the towing vehicle.

The present improvement consists in a U-shaped support 15 provided by a side member 16 having an inwardly curved end portion 17 and an opposite member 18 also having an inwardly curved portion 19 fixedly joined to end portion 17. Member 16 has an end 21 rotatably mounted upon a stub axle 20 extending laterally of and fixedly connected to trailer frame 1. Member 18 likewise has an end 23 rotatably connected to a stub axle 22 extending laterally from and fixedly connected to trailer frame 2. Stub axles 20 and 22 extend in line with one another.

Trailer frame 1 supports limiting means for member 16 which means consists of a control rod 24 pivotally connected at one end 25 to a link 26. Said link 26 is fixedly connected to connecting rod 28 which is pivotally supported at its middle to pin 27 supported upon frame 1. One end of said connecting rod is pivotally connected at 29 to a plunger 30 extending laterally through opening 31 in frame 1. The opposite end of connecting rod 28 is pivotally connected at 32 to a second plunger 33 laterally slidable through opening 34 of frame 1.

Plungers 30 and 33 are positioned on opposite sides of stub axle 20 and positioned for engaging opposite sides of member 16 as will be more fully explained hereinafter.

Control rod 24 is pivotally connected at 35 to a control lever 36 and which lever is further pivotally connected at 37 to a stub axle 38 carried by bearing 39 upon the forward end of frame 1. Said control rod slightly extends through opening 40 of said frame 1.

Resilient means as best shown in FIGS. 6 and 7 are provided for either or both of the members 16 and 18 and such resilient means for member 16 only is shown. Said means consists of a plate 41 fixedly connected to and laterally extending from trailer frame 1 on one side of axle 20 and having an annular flange 42 encircled by one end of a coil spring 43 whose other end encircles an annular flange 44 of a second plate fixedly connected to and laterally extending from support 16. Said metal plate has a second annular flange 46 on the opposite side thereof encircled by one end portion of a second coil spring 47 whose opposite end portion encircles annular flange 48 extending laterally from one face of a second end plate 49 fixedly connected to and laterally extending from trailer frame 1.

In the operation of the present trailer, a boat A is shown as one example of an object which can be mounted and dismounted therefrom, and particularly while the trailer is connected to the trailer hitch B of a towing vehicle C as shown in FIG. 4. That is, the connector 10 is connected to the trailer hitch B supporting the trailer in a horizontal position upon the wheels 50 and 50' rotatably supporting opposite medial portion of the trailer. Flexible member 13 is connected to the apex of the support 15 and extends over a pulley 51 pivotally supported to said support apex by a member 52 and extends down to a cradle 53 which may be made of a flexible material such as canvas, plastic, or may be made of a light-weight material. Said cradle 53 is of a U-shape in that it extends across the bottom of the boat A and up the opposite sides thereof where it is joined by cables 54 and 55 to cable 13 at the medial portion of the boat. A stop 56 is fixedly connected to cable 13 a short distance above said cradle. Upon releasing support 15 from the position shown in FIG. 1 either by moving plunger 30 inwardly out of engagement with member 16 or by unwinding cable 13 from reel 12, spring 43 is permitted to position said support 16 to the position shown in FIG. 4. Thereupon control lever 36 is pivoted forwardly moving control rod 24 and extending plunger 30 to the position of FIG. 5 preventing member 16 from moving forwardly of the trailer. Upon winding reel 12 taking in cable 13, cradle 53 and thus boat A will be moved over rollers 8 downwardly towards the rear of the trailer but also upwardly towards the pulley 51. As the cradle and boat continue to move upwardly, they will tend to swing outwardly of the trailer placing the entire weight of the boat upon the support 15, which will gradually lower against the restraining force of spring 47 as shown in dotted lines in FIG. 4. The boat will thus be positioned upon a surface such as the water a distance behind the trailer without the necessity of moving the trailer wheels 50 into the water or upon the soft surface of the beach adjacent thereto.

To pick up objects such as the boat A, the trailer is positioned with the end 7 laterally of and in front of the boat. Cradle 53 is positioned under and around the medial portion of the boat and connected to cable 13. Reel 12 is wound to reel in cable 13 raising the boat towards the pulley 51 until the stop 56 engages said pulley whereupon continued winding of reel 12 pulls support 15 to an opposite position and lever 36 is moved backwardly withdrawing plunger 30 and extending plunger 33. Continued winding of reel 12 brings support 15 over the top of the trailer lowering boat A thereon against the spring 43 and finally returning the support 15 to the position shown in FIG. 1 whereupon lever 36 can again be actuated extending plunger 30 above member 16 retaining the support on the trailer.

However, the support 15 can be lifted in a slight, upwardly extending angle towards the top of upright 11 where it can be retained by cable 13 and will provide a protecting guard for the boat.

It is also to be appreciated that the cables 54 and 55 can be detachably connected directly to the boat in any conventional manner such as having hooks engaging eyes fixedly mounted within the cockpit of the boat to the frame thereof and these eliminate the cradle 53.

It is to be appreciated that support 15, the restricting means therefor of FIG. 5 and the resilient means of FIG. 6 can be readily employed with or attached to other types of trailers, either new or old.

Also stub axles 20 and 22 may be torsion bars fixedly connected to frame 1 and members 16 and 18 respectively providing a resilient pivotal connection therebetween.

The present trailer is capable of considerable modification, and such changes thereto as come within the scope of the appended claims are deemed to be a part thereof.

I claim:

1. A mobile boat trailer comprising an elongated boat supporting frame, wheels connected to said frame for supporting the same, an elongated load support pivotally connected at one end portion to an end portion of said frame, reeling means carried by the opposite end portion of said frame, rotatable means carried by said load support, a flexible member wound on said reeling means and extending over said support rotatable means, means for connecting said flexible member to a medial portion of the boat, a stop adjustably connected to said flexible member adjacent said connecting means and capable of engaging said support rotatable means limiting the movement of said flexible member therethrough, a pair of plungers slideably carried by said frame each on an opposite side of the pivotal connection of said support to said frame and means for alternately sliding said plungers to positions in the pivotal path of said support for limiting the pivoting of said support in either direction as desired.

2. A mobile boat trailer comprising an elongated boat supporting frame, wheels connected to said frame for supporting the same, an elongated load support pivotally connected at one end portion to an end portion of said frame, reeling means carried by the opposite end portion of said frame, rotatable means carried by said load support, a flexible member wound on said reeling means and extending over said support rotatable means, means for connecting said flexible member to a medial portion of the boat, a stop adjustably connected to said flexible member adjacent said connecting means and capable of engaging said support rotatable means limiting the movement of said flexible member therethrough, a link pivotally mounted on said frame, a pair of plungers pivotally connected to said link and extending on opposite sides of the pivotal connection of said support to said frame and a control rod for pivoting said link and moving one of said plungers at a time into the pivotal path of said support for limiting the pivoting of said support in either direction as desired.

3. A mobile boat trailer as claimed in claim 1 wherein the pivotal connection of said load support to said frame consists of at least one torsion bar fixedly connected to said support and said frame.

References Cited in the file of this patent

UNITED STATES PATENTS

| | | |
|---|---|---|
| 2,190,258 | Colorigh | Feb. 13, 1940 |
| 2,571,361 | Harmanson | Oct. 16, 1951 |
| 2,608,314 | Krider | Aug. 26, 1952 |
| 2,747,754 | Maynard | May 29, 1956 |
| 2,960,320 | Heider | Nov. 15, 1960 |